United States Patent
Iguchi et al.

(10) Patent No.: US 12,424,388 B2
(45) Date of Patent: *Sep. 23, 2025

(54) ELECTRONIC DEVICE

(71) Applicant: TDK CORPORATION, Tokyo (JP)

(72) Inventors: Toshihiro Iguchi, Tokyo (JP); Daisuke Yoshida, Tokyo (JP)

(73) Assignee: TDK CORPORATION, Tokyo (JP)

(*) Notice: Subject to any disclaimer, the term of this patent is extended or adjusted under 35 U.S.C. 154(b) by 143 days.

This patent is subject to a terminal disclaimer.

(21) Appl. No.: 18/464,439

(22) Filed: Sep. 11, 2023

(65) Prior Publication Data

US 2024/0120152 A1   Apr. 11, 2024

(51) Int. Cl.
*H01G 4/30* (2006.01)
*H01G 4/012* (2006.01)
*H01G 4/10* (2006.01)
*H01G 4/248* (2006.01)

(52) U.S. Cl.
CPC .............. *H01G 4/30* (2013.01); *H01G 4/012* (2013.01); *H01G 4/10* (2013.01); *H01G 4/248* (2013.01)

(58) Field of Classification Search
CPC ............ H01G 4/30; H01G 4/012; H01G 4/10; H01G 4/248
See application file for complete search history.

(56) References Cited

U.S. PATENT DOCUMENTS

| | | | | |
|---|---|---|---|---|
| 2002/0075632 A1* | 6/2002 | Nakano | ............ | H01G 4/12 361/320 |
| 2005/0117274 A1* | 6/2005 | Miyauchi | ............ | H01G 4/12 361/321.2 |
| 2010/0195260 A1* | 8/2010 | Ishihara | ............ | H01G 4/30 361/313 |
| 2011/0235233 A1* | 9/2011 | Ando | ............ | H01G 4/1227 361/301.4 |
| 2011/0304946 A1* | 12/2011 | Koga | ............ | H01C 7/123 361/118 |
| 2017/0025222 A1* | 1/2017 | Park | ............ | H01G 4/1209 |
| 2021/0012968 A1* | 1/2021 | Taniguchi | ............ | H01G 4/1227 |
| 2022/0102077 A1* | 3/2022 | Kitahara | ............ | H01G 4/008 |
| 2022/0139624 A1* | 5/2022 | Sim | ............ | H01G 4/224 361/301.4 |
| 2023/0080684 A1* | 3/2023 | Kim | ............ | H01G 4/30 361/321.2 |

FOREIGN PATENT DOCUMENTS

JP   2008-305844 A   12/2008

* cited by examiner

*Primary Examiner* — Michael P McFadden
(74) *Attorney, Agent, or Firm* — Oliff PLC

(57) ABSTRACT

An electronic device includes an element body. The element body includes at least two internal electrode layers and a dielectric layer laminated between the internal electrode layers. Ni oxide particles exist at a boundary between the internal electrode layers and the dielectric layer. The dielectric layer is in contact with the internal electrode layers at first and second boundaries. The dielectric layer includes a first dielectric large particle and a second dielectric large particle. The first dielectric large particle is in contact with at least one of the Ni oxide particles existing at the first boundary and in contact with one of the internal electrode layers at the second boundary. The second dielectric large particle is in contact with at least one of the internal electrode layers at the first boundary and in contact with at least one of the Ni oxide particles existing at the second boundary.

6 Claims, 8 Drawing Sheets

ELECTRONIC DEVICE

The present application claims a priority based on Japanese Patent Application No. 2022-156616 filed on Sep. 29, 2022 and incorporates it into the present specification by reference to that disclosure in its entirety.

BACKGROUND OF THE INVENTION

The present invention relates to an electronic device including a dielectric layer and an internal electrode layer.

Ceramic capacitors including dielectric layers and internal electrode layers are widely employed for various electronic circuits and power supply circuits. For the ceramic capacitors, it is required that characteristics, such as capacitance, do not vary due to temperature changes and are stable. For example, Patent Document 1 (JP2008305844 (A)) discloses a multilayer ceramic capacitor in which dielectric layers containing dielectric particles with a core-shell structure are laminated and also discloses that this multilayer ceramic capacitor can reduce variation in capacitance due to temperature.

The characteristics that vary due to temperature include not only the capacitance, but also the resistance value, which tends to decrease as the temperature rises. Thus, it is required to reduce variation in resistance value due to temperature.

BRIEF SUMMARY OF THE INVENTION

It is an object of an exemplary embodiment according to the present disclosure to provide an electronic device with improved temperature dependence of resistance value.

To achieve the above object, an electronic device according to a first aspect of the present disclosure comprises:
an element body including:
    at least two internal electrode layers; and
    a dielectric layer laminated between the internal electrode layers, wherein
Ni oxide particles exist at a boundary between the internal electrode layers and the dielectric layer,
the dielectric layer is in contact with the internal electrode layers at a first boundary and a second boundary of the boundary, and
the dielectric layer includes:
    a first dielectric large particle in contact with at least one of the Ni oxide particles existing at the first boundary and in contact with one of the internal electrode layers at the second boundary; and
    a second dielectric large particle in contact with at least one of the internal electrode layers at the first boundary and in contact with at least one of the Ni oxide particles existing at the second boundary.

The electronic device according to the first aspect has the above-mentioned features and can thus reduce variation in the resistance value due to temperature. For example, $R_{20}/R_{85}$ can be reduced to 2.0 or less, where $R_{20}$ is a resistance value of the electronic device at 20° C., and $R_{85}$ is a resistance value of the electronic device at 85° C.

Preferably, the dielectric layer comprises dielectric layers, and the Ni oxide particles include a first Ni oxide particle in contact with both of two dielectric layers next to each other via the internal electrode layers.

The dielectric layer comprises dielectric layers, and each of the internal electrode layers is preferably in contact with two or more Ni oxide particles on average in a cross section of the element body.

The dielectric layer comprises dielectric layers, and an average number of the Ni oxide particles in contact with the internal electrode layers per unit length is preferably 0.002 particles/μm or more.

The dielectric layer comprises dielectric layers, the dielectric layers may include third dielectric large particles in contact with both of the Ni oxide particles at the first boundary and the Ni oxide particles at the second boundary, and an average number of the third dielectric large particles contained in the dielectric layers per unit length is preferably 0 or more and 0.0003 particles/μm or less.

An electronic device according to a second aspect of the present disclosure comprises:
an element body including:
    at least two internal electrode layers; and
    a dielectric layer laminated between the internal electrode layers, wherein
a p-type semiconductor particle exists at a boundary between the internal electrode layers and the dielectric layer,
the dielectric layer is in contact with the internal electrode layers next to each other at a first boundary and a second boundary of the boundary, and
the dielectric layer includes:
    a first dielectric large particle in contact with the p-type semiconductor particle existing at the first boundary and in contact with one of the internal electrode layers at the second boundary; and
    a second dielectric large particle in contact with one of the internal electrode layers at the second boundary and in contact with the p-type semiconductor particle existing at the second boundary.

The electronic device according to the second aspect has the above-mentioned features and can thus reduce variation in the resistance value due to temperature. For example, $R_{20}/R_{85}$ can be reduced to 2.0 or less, where $R_{20}$ is a resistance value of the electronic device at 20° C., and $R_{85}$ is a resistance value of the electronic device at 85° C.

BRIEF DESCRIPTION OF THE DRAWING(S)

DETAILED DESCRIPTION OF THE INVENTION

Hereinafter, an embodiment of the present disclosure is described with reference to the drawings.

Figure 1:
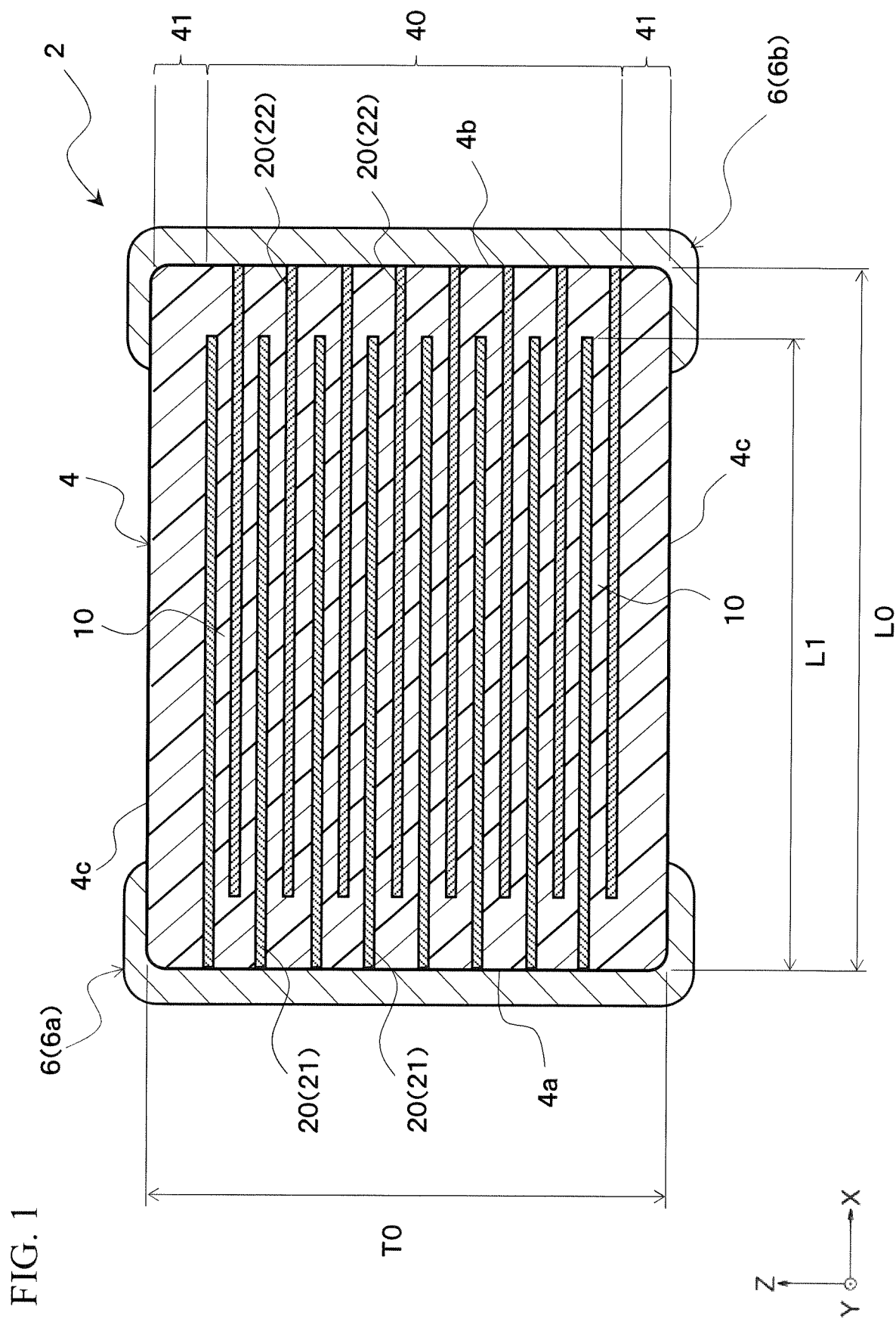
FIG. 1 is a schematic view illustrating a cross section of an electronic device according to an embodiment of the present disclosure.

As shown in FIG. 1, a multilayer ceramic electronic device 2 according to the present embodiment includes an element body 4 and a pair of external electrodes 6 formed on an outer surface of the element body 4.

The element body 4 shown in FIG. 1 normally has a substantially rectangular parallelepiped shape and includes two end surfaces 4a and 4b along the Y-Z plane and four side surfaces 4c connecting the two end surfaces 4a and 4b. However, the shape of the element body 4 is not limited and may be an elliptical columnar shape, a cylindrical columnar shape, a prismatic shape, or the like. The outer dimensions of the element body 4 are not limited, either. For example, the length L0 in the X-axis direction can be 0.2 mm to 5.7 mm, the width W0 in the Y-axis direction can be 0.1 mm to 5.0 mm, and the height T0 in the Z-axis direction can be 0.1 mm to 3.0 mm. Note that, in the present embodiment, the X-axis, the Y-axis, and the Z-axis are perpendicular to each other.

As the pair of external electrodes 6, the multilayer ceramic electronic device 2 includes a first external electrode 6a in contact with one end surface 4a and a second external electrode 6b in contact with the other end surface 4b. The first external electrode 6a and the second external electrode 6b are electrically insulated so as not to contact with each other in the X-axis direction. Each of the external electrodes 6 is conductive, and the specifications (material, structure, thickness, etc.) of each of the external electrodes 6 are not limited. Each of the external electrodes 6 may include a baked electrode layer, a resin electrode layer, a plated electrode layer, etc. and may have a single-layer structure or a multilayer structure with a plurality of electrode layers. For example, each of the external electrodes 6 may have a three-layer structure of a baked electrode layer containing Cu, a Ni plating layer, and an Sn plating layer (laminated in this stated order).

The element body 4 includes a capacitance region 40 and exterior regions 41 located on the outside of the capacitance region 40. The capacitance region 40 includes dielectric layers 10 and internal electrode layers 20 substantially parallel to a plane including the X-axis and Y-axis, and the dielectric layers 10 and the internal electrode layers 20 are laminated alternately along the Z-axis. Here, "substantially parallel" means that most portions are parallel, but there may be portions that are not parallel to some extent, and both of the dielectric layers 10 and the internal electrode layers 20 may be slightly uneven or inclined.

The internal electrode layers 20 in the capacitance region 40 can be classified into first internal electrode layers 21 and second internal electrode layers 22. A part of the edge of each of the first internal electrode layers 21 is exposed to one end surface 4a, and each of the first internal electrode layers 21 is electrically connected to the first external electrode 6a. A part of the edge of each of the second internal electrode layers 22 is exposed to the other end surface 4b, and each of the second internal electrode layers 22 is electrically connected to the second external electrode 6b.

Each of the dielectric layers 10 in the capacitance region 40 is laminated between the first internal electrode layer 21 and the second internal electrode layer 22. In other words, the first internal electrode layer 21 and the second internal electrode layer 22 are insulated from each other via the dielectric layer 10. Thus, the capacitance region 40 has a structure in which the first internal electrode layers 21, the dielectric layers 10, and the second internal electrode layers 22 are repeatedly laminated in this stated order. When voltage is applied to the multilayer ceramic electronic device 2, the first external electrode 6a and the second external electrode 6b have polarities different from each other, and voltage can be applied to each of the dielectric layers 10 in the capacitance region 40.

In the present embodiment, the junction interfaces between the dielectric layers 10 and the first internal electrode layers 21 are referred to as first boundaries 31, and the junction interfaces between the dielectric layers 10 and the second internal electrode layers 22 are referred to as second boundaries 32. In other words, each of the dielectric layers 10 is in contact with the first internal electrode layer 21 at the first boundary 31 and in contact with the second internal electrode layer 22 at the second boundary 32. Note that, in the description of the present embodiment, when the term "internal electrode layers 20" is generically used without distinguishing between the first internal electrode layers 21 and the second internal electrode layers 22, the description with the term "internal electrode layers 20" is related to the first internal electrode layers 21 and the second internal electrode layers 22 in common.

The exterior regions 41 are laminated on the outer side of the capacitance region 40 in the Z-axis direction and cover the upper surface and the lower surface of the capacitance region 40. Also, the exterior regions 41 may exist on the outer side of the capacitance region 40 in the Y-axis direction. That is, the side surfaces of the capacitance region 40 intersecting the Y-axis may be covered with the exterior regions 41 not including the internal electrode layers 20. The material and thickness of the exterior regions 41 are not limited. For example, the exterior regions 41 may contain a dielectric compound having a composition similar to that of the dielectric layers 10 and may contain a glass component along with the dielectric compound. In principle, the exterior regions 41 are regions that do not include the internal electrode layers 20, but may include a dummy electrode that does not contribute to capacitance.

The dielectric layers 10 contain a dielectric compound as a main component. The main component of the dielectric layers 10 is a component that accounts for 80 mol % or more in the dielectric layers 10, and the material of the dielectric compound, which is the main component, is not limited. For example, the main component of the dielectric layers 10 is a dielectric compound having a perovskite structure, such as $BaTiO_3$, $Ba(Ti, Zr)O_3$, $(Ba, Ca)TiO_3$, $(Ba, Ca)(Ti, Zr)O_3$, $(Ca, Sr)TiO_3$, $(Ca, Sr)ZrO_3$, $(Ca, Sr)(Zr, Ti)O_3$, and $(K, Na)NbO_3$, or a dielectric compound having a tungsten bronze structure, such as $Ba_3ZrNb_4O_{15}$, $Ba_3TiNb_4O_{15}$, and $(K, Na)Sr_2Nb_5O_{15}$.

Moreover, the dielectric layers 10 may contain one or more types of subcomponents along with the main component. The types and the content rate of subcomponents contained in the dielectric layers 10 are not limited. For example, as subcomponents, the dielectric layers 10 may contain a Si compound, an Al compound, an Mn compound, a Mg compound, a Cr compound, a Ni compound, a compound containing a rare earth element, a Li compound, a B compound, a V compound, or the like. Note that, the main component and the subcomponents of the dielectric layers 10 can be determined by component analysis using wavelength dispersive X-ray spectrometer (WDS), energy dispersive X-ray spectrometer (EDS), laser ablation ICP mass spectrometry (LA-ICP-MS), etc.

The average thickness $T_{DL}$ of the dielectric layers 10 is preferably 1.7 μm or less, more preferably 0.17 μm or more and 0.86 μm or less. Moreover, the capacitance region 40 includes at least one dielectric layer 10, and the lamination number of dielectric layers 10 in the capacitance region 40 is not limited. For example, the capacitance region 40 preferably includes 20 or more dielectric layers 10, more preferably 50 or more dielectric layers 10. Note that, the average thickness $T_{DL}$ of the dielectric layers 10 is calculated by observing a cross section of the element body 4 using a metallurgical microscope or an electron microscope. For example, it is preferable to analyze five or more dielectric layers 10, and the average thickness $T_{DL}$ of the dielectric layers 10 is preferably calculated by measuring the thickness of each of the dielectric layers 10 to be analyzed at least at 30 points.

Each of the dielectric layers 10 includes a plurality of dielectric particles 11 and grain boundaries 17 as interfaces between dielectric particles 11 next to each other. The dielectric particles 11 are crystal particles containing a main component of the dielectric layers 10, and the dielectric particles 11 in the dielectric layers 10 can be analyzed by observing a cross section of the element body 4 using an electron microscope, such as a scanning transmission electron microscope (STEM) and a scanning electron microscope (SEM). The subcomponents of the dielectric layers 10 may be solid-soluted in the dielectric particles 11, and the dielectric particles 11 may have a core-shell structure by solid solution of the subcomponents. Moreover, the dielectric layers 10 may contain a segregation phase in which the concentration of the predetermined element is higher than that in the dielectric particles 11.

The average particle size $d_{DP}$ of the dielectric particles 11 is preferably 0.05 m or more, more preferably 0.1 μm or more and 1 μm or less. Also, the ratio $(T_{DL}/d_{DP})$ of the average thickness $T_{DL}$ of the dielectric layers 10 to the average particle size $d_{DP}$ of the dielectric particles 11 is preferably 1.5 or less, more preferably 1 or less. Note that, the average particle size $d_{DP}$ of the dielectric particles 11 is an arithmetic mean value of equivalent circle diameters of the dielectric particles 11. For example, it is preferable to observe a cross section of the element body 4 and analyze five or more dielectric layers 10, and the average particle size $d_{DP}$ is preferably calculated by measuring equivalent circle diameters of at least 50 dielectric particles 11.

When a cross section of dielectric layers 10 along their thickness direction (Z-axis direction) is analyzed, the dielectric particles 11 can be classified into large particles 13 and small particles 15. That is, in the description of the present embodiment, the "dielectric particles 11" are a general term for the large particles 13 and the small particles 12, and the dielectric particles 11 include the large particles 13 and the small particles 12.

The large particle 13 is the dielectric particle 11 in contact with both of the first boundary 31 (joint boundary between the dielectric layer 10 and the first internal electrode layer 21) and the second boundary 32 (joint boundary between the dielectric layer 10 and the second internal electrode layer 22). That is, the large particle 13 is the dielectric particle 11 appearing on both of the upper surface and the lower surface of the dielectric layer 10 containing this large particle 13. The length of the large particle 13 in the Z-axis direction substantially corresponds with the thickness of the dielectric layer 10 at the existence location of this large particle 13. On the other hand, the small particle 15 is the dielectric particle 11 other than the large particle 13. That is, the dielectric particle 11 in contact with only one of the first boundary 31 and the second boundary 32 and the dielectric particle 11 not in contact with either the first boundary 31 or the second boundary 32 correspond with the small particles 15.

The average number of large particles 13 contained in the dielectric layers 10 per unit length is preferably 0.05 particles/μm or more, more preferably 0.1 particles/μm or more.

The upper limit of the average number of large particles 13 is not limited and may be, for example, 3 particles/μm or less.

The average number of large particles 13 described above is represented by ND/LD, where LD is a total length of dielectric layers 10 observed in a cross section of the capacitance region 40, and ND is a number of large particles 13 contained in the dielectric layers 10 having the total length LD. In the calculation of ND/LD, it is preferable to analyze five or more dielectric layers 10, and the total length LD of the dielectric layers 10 is preferably 30 μm or more. Moreover, it is preferable to determine the analysis field of view so that the edge of the analysis field of view is substantially parallel to the dielectric layers 10. In this case, the length of the edge of the analysis field of view substantially parallel to the dielectric layers 10 can be regarded as the length of the dielectric layers 10 in this analysis field of view. For example, the length of each of the dielectric layers 10 in FIG. 2 may be regarded as a length $L_X$ of the analysis field of view in the X-axis direction.

Each of the internal electrode layers 20 is conductive and contains a metal component. The composition of the internal electrode layers 20 is not limited. For example, as the metal component, the internal electrode layers 20 may contain at least one selected from Ni, Cu, Ag, Pd, Au, and Pt. When the main component of the dielectric layers 10 has reduction resistance, the metal component of the internal electrode layers 20 is preferably pure Ni or a Ni alloy containing 85 wt % or more of Ni. In this case, the Ni alloy may contain subcomponents, such as Cu, Cr, and Mn. Note that, the metal component of the internal electrode layers 20 can be determined by component analysis using WDS, EDS, LA-ICP-MS, etc.

Figure 2:
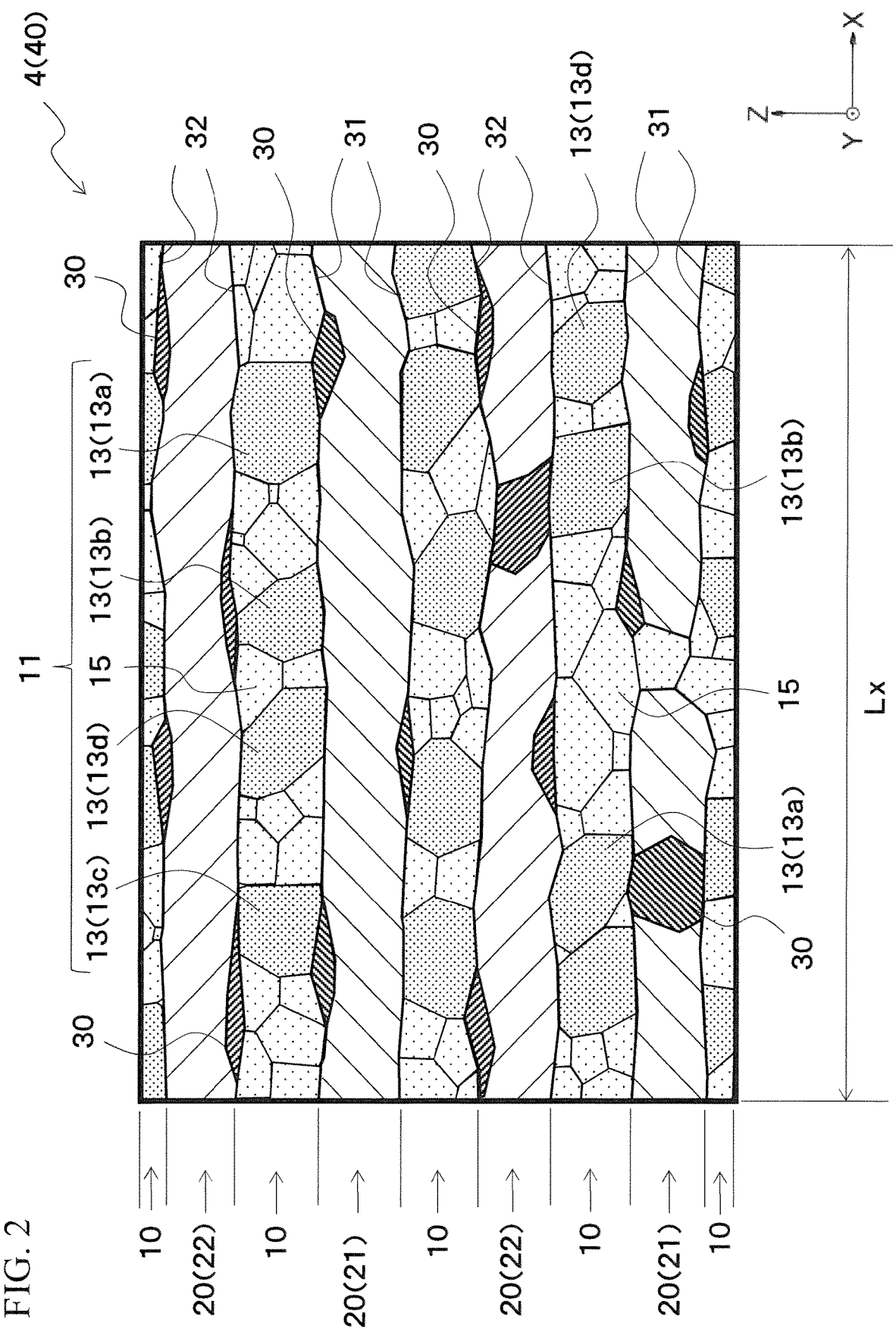
FIG. 2 is an enlarged schematic view of the cross section of an element body shown in FIG. 1.

As an inhibitor, the internal electrode layers 20 may contain particles of a dielectric compound having a composition similar to that of the main component of the dielectric layers 10. Moreover, the internal electrode layers 20 may contain a fine amount (e.g., about 0.1 mass % or less) of a non-metallic element, such as S and P, and may contain voids. When the internal electrode layers 20 are observed in a cross section as shown in FIG. 1 and FIG. 2, there may be a location where the internal electrode layers 20 appear to be partially cut off.

The internal electrode layers 20 are laminated between the dielectric layers 10 in the Z-axis direction, and the lamination number of internal electrode layers 20 in the capacitance region 40 is determined based on the lamination number of dielectric layers 10. The average thickness $T_{EL}$ of the internal electrode layers 20 is not limited and is, for example, preferably 3 μm or less, more preferably 0.2 μm or more and 1 μm or less. The average thickness $T_{EL}$ of the internal electrode layers 20 is calculated by observing a cross section of the element body 4 using a metallurgical microscope or an electron microscope. For example, it is preferable to analyze five or more internal electrode layers 20, and the average thickness $T_{EL}$ of the internal electrode layers 20 is preferably calculated by measuring the thickness of each of the internal electrode layers 20 to be analyzed at least at 30 points.

When a cross section of the internal electrode layers 20 is analyzed by a combination of STEM or SEM and EDS or WDS, it can be confirmed that the internal electrode layers 20 contain crystal particles of the metal component (hereinafter, referred to as metal crystals). The average particle size $d_M$ of the metal crystals contained in each of the internal electrode layers 20 is not limited and is, for example, preferably 1 μm or less, more preferably 0.03 μm or more and 0.8 μm or less. Note that, the average particle size $d_M$ of the metal crystals is an arithmetic mean value of circle equivalent diameters of the metal crystals. For example, it is preferable to observe a cross section of the element body 4 and analyze five or more internal electrode layers 20, and the average particle size $d_M$ is preferably calculated by measuring circle equivalent diameters of at least 50 metal crystals contained in each of the internal electrode layers 20 to be analyzed.

Note that, in the cross-sectional analysis by a combination of STEM or SEM and EDS or WDS, the internal electrode layers 20 contained in the analysis field of view are classified into the first internal electrode layers 21 and the second internal electrode layers 22 by the following procedure. First, serial integer numbers are given to the internal electrode layers 20 observed within the analysis field of view in order from the lower side or the upper side of the analysis field of view. Then, the odd-numbered internal electrode layers 20 are defined as the first internal electrode layers 21, and the even-numbered internal electrode layers 20 are defined as the second internal electrode layers 22.

As shown in FIG. 2, the capacitance region 40 contains Ni oxide particles 30. The Ni oxide particles 30 mainly contain NiO and may slightly contain elements contained in the dielectric layers 10 and the internal electrode layers 20. The amount of components other than NiO in the Ni oxide particles 30 is not limited, but the total content rate of Ni and O in the Ni oxide particles 30 is preferably 80 mol % or more. Note that, the Ni oxide particles 30 in the capacitance region 40 can be determined by performing a mapping analysis in the cross section of the element body 4 as shown in FIG. 2. For example, a mapping image of Ni and a mapping image of O (oxygen) are photographed, and regions having a concentration of Ni higher than that of the dielectric layers 10 and a concentration of O higher than that of the internal electrode layers 20 are determined as the Ni oxide particles 30.

The Ni oxide particles 30 in the capacitance region 40 exist at the boundaries (31, 32) between the dielectric layers 10 and the internal electrode layers 20. More specifically, the capacitance region 40 includes the Ni oxide particles 30 existing at the first boundaries 31 between the dielectric layers 10 and the first internal electrode layers 21 and the Ni oxide particles 30 existing at the second boundaries 32 between the dielectric layers 10 and the second internal electrode layers 22.

Here, more specifically, "existing at the boundaries (31, 32) between the dielectric layers 10 and the internal electrode layers 20" means that the Ni oxide particles 30 are in contact with both of the dielectric particles 11 of the dielectric layers 10 and the metal components of the internal electrode layers 20. The Ni oxide particles 30 may exist so as to enter the internal electrode layers 20 from the boundaries (31, 32) or may exist so as to enter the dielectric layers 10 from the boundaries (31, 32).

Note that, the capacitance region 40 may include the Ni oxide particles 30 existing at locations other than at the boundaries (31, 32) between the dielectric layers 10 and the internal electrode layers 20. For example, the capacitance region 40 may include the Ni oxide particles 30 contained in the internal electrode layers 20 and not in contact with the dielectric layers 10 and the Ni oxide particles 30 contained in the dielectric layers 10 and not in contact with the internal electrode layers 20.

The Ni oxide particles 30 are described in more detail. At the first boundaries 31, there are at least the Ni oxide particles 30 in contact with the large particles 13 of the dielectric layers 10, and there may be the Ni oxide particles 30 not in contact with the large particles 13 but in contact with the small particles 15. Likewise, at the second boundaries 32, there are at least the Ni oxide particles 30 in contact with the large particles 13 of the dielectric layers 10, and there may be the Ni oxide particles 30 not in contact with the large particles 13 but in contact with the small particles 15.

As shown in FIG. 2, the large particles 13 observed in the cross section of the dielectric layers 10 can be classified into four types of first large particles 13a to fourth large particles 13d. The first large particles 13a are the large particles 13 in contact with the Ni oxide particles 30 at the first boundaries 31 and in contact with the metal components of the second internal electrode layers 22 at the second boundaries 32. The second large particles 13b are the large particles 13 in contact with the metal components of the first internal electrode layers 21 at the first boundaries 31 and in contact with the Ni oxide particles 30 at the second boundaries 32. The third large particles 13c are the large particles 13 in contact with both of the Ni oxide particles 30 at the first boundaries 31 and the Ni oxide particles 30 at the second boundaries 32. The fourth large particles 13d are the large particles 13 not in contact with the Ni oxide particles 30 and are in contact with the metal components of the first internal electrode layers 21 at the first boundaries 31 and in contact with the metal components of the second internal electrode layers 22 at the second boundaries 32. The dielectric layers 10 include at least the first large particles 13a and the second large particles 13b and may include the third large particles 13c and the fourth large particles 13d.

Figure 4A:
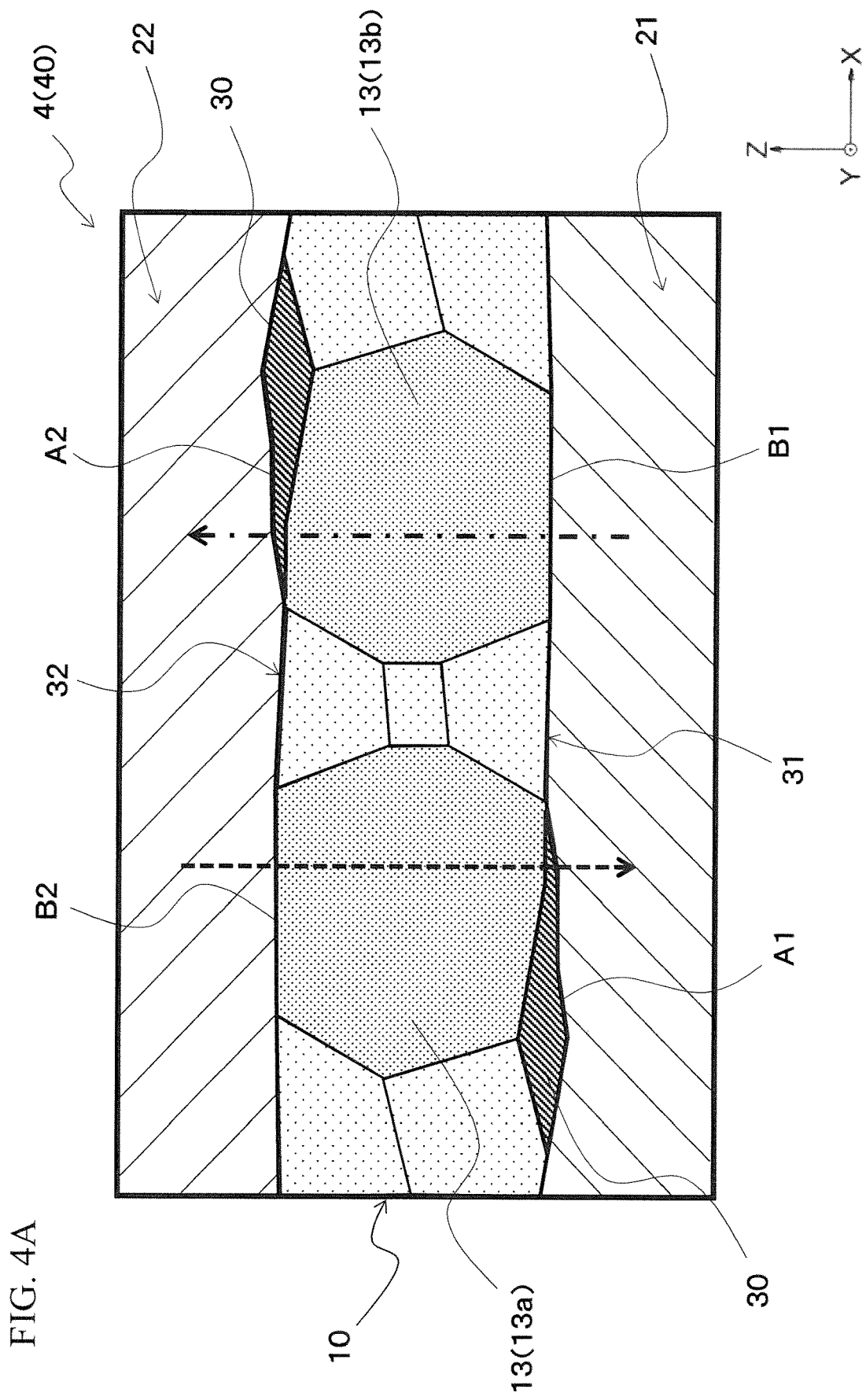
FIG. 4A is an enlarged schematic view of a part of a boundary between a dielectric layer and internal electrode layers.

FIG. 4A is an enlarged schematic view of a cross section of an existence location of the first large particle 13a and the second large particle 13b. At the existence location of the first large particle 13a, there is a structure in which the metal component of the first internal electrode layer 21, the Ni oxide particle 30, the first large particle 13a, and the metal component of the second internal electrode layer 22 are connected in this stated order. On the other hand, at the existence location of the second large particle 13b, there is a structure in which the metal component of the first internal electrode layer 21, the second large particle 13b, the Ni oxide particle 30, and the metal component of the second internal electrode layer 22 are connected in this stated order. Since the capacitance region 40 of the multilayer ceramic electronic device 2 includes the structure shown in FIG. 4A, the temperature dependence of the resistance value can be reduced. That is, even in a high temperature range (e.g., 85° C. or higher), a decrease in resistance value can be prevented, and insulation resistance can be maintained.

The reason why the temperature dependence of the resistance value can be improved is not necessarily clear, but the Schottky barrier is considered to be related. Hereinafter, a hypothesis regarding the insulation resistance between the internal electrode layers is described based on FIG. 3A to FIG. 4B.

Figure 3A:
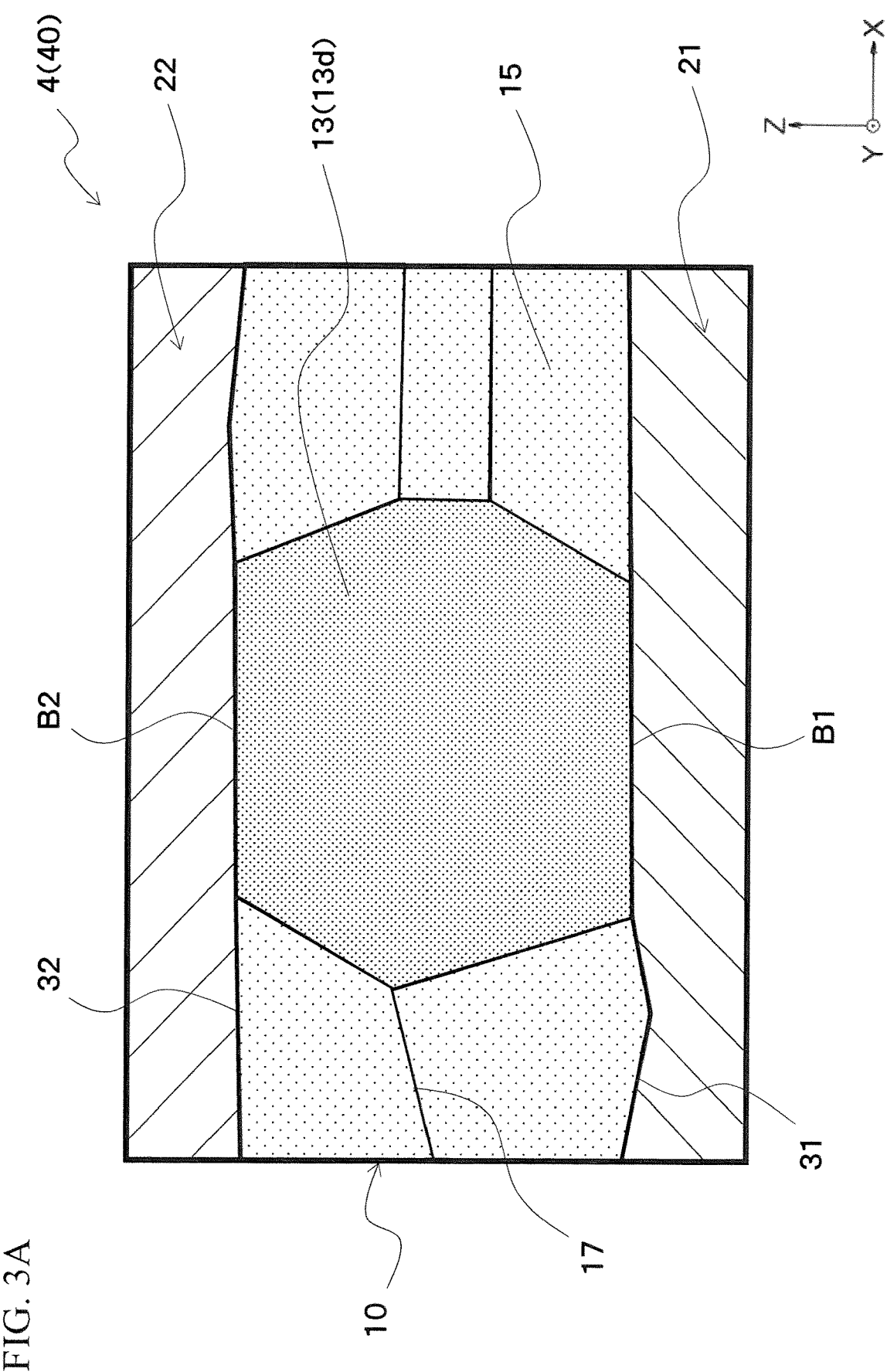
FIG. 3A is an enlarged schematic view of a part of a boundary between a dielectric layer and internal electrode layers.

First, the insulation resistance between the internal electrode layers when the Ni oxide particles 30 do not exist is described. FIG. 3A is an enlarged schematic view of a cross section of a location where the Ni oxide particles 30 are not interposed. That is, the fourth large particle 13d and the small particle 15 exist in the cross section of the dielectric layer 10 shown in FIG. 3A. In particular, at the existence location of the small particles 15, there is a structure in which two or more small particles 15 are connected in the thickness direction via the grain boundaries 17. A junction interface B between the metal component of the internal electrode layer 20 and the dielectric particle 11 exists between the internal electrode layers 20 and the dielectric layers 10. Among the junction interfaces B, the interface between the metal component of the first internal electrode layer 21 and the dielectric particle 11 (13, 15) is referred to as a junction interface B1, and the interface between the metal component of the second internal electrode layer 22 and the dielectric particle 11 (13, 15) is referred to as a junction interface B2.

Figure 3B:
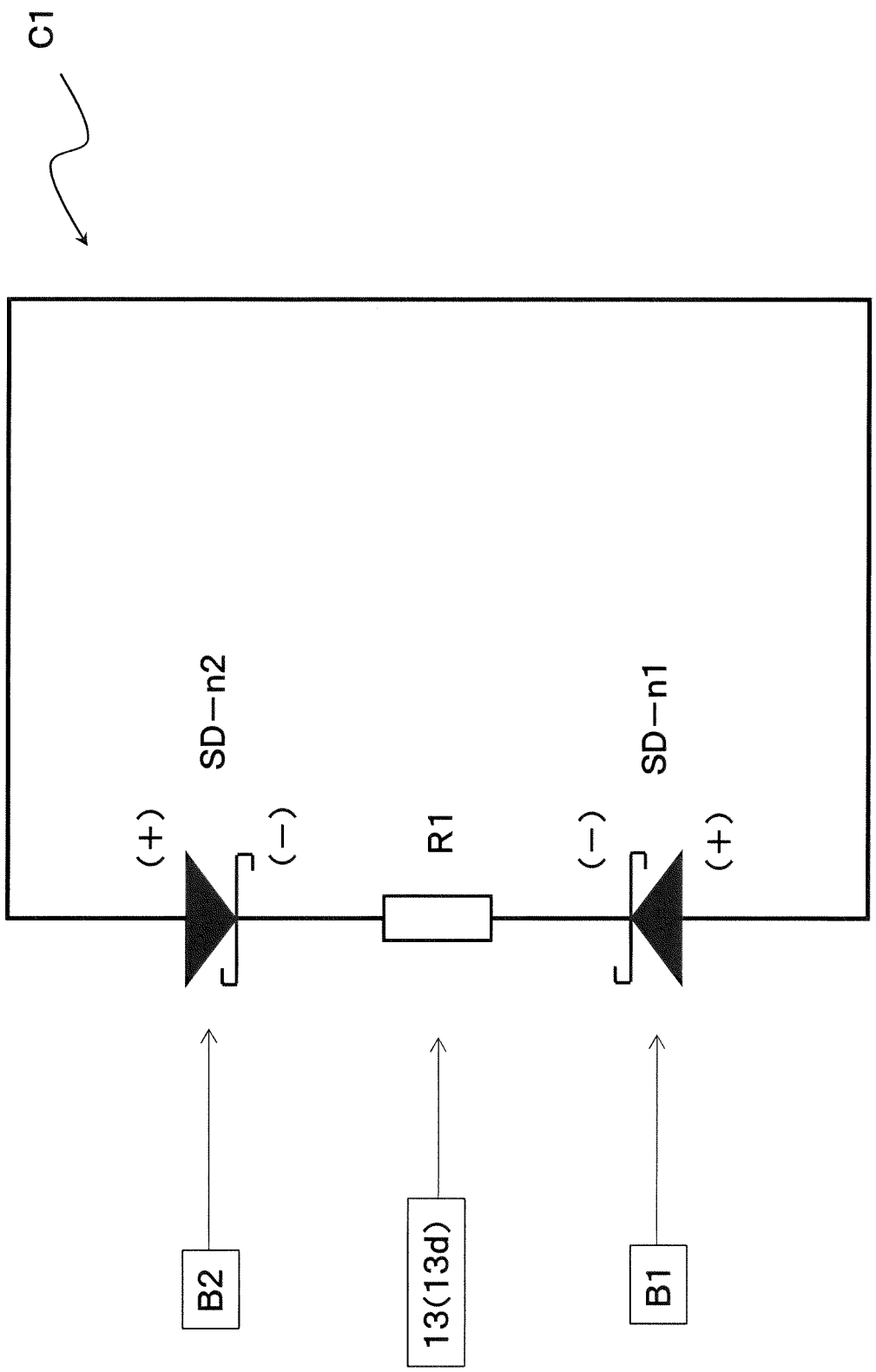
FIG. 3B is a conceptual view illustrating a circuit relating to the structure shown in FIG. 3A.

Here, the dielectric compound as the main component of the dielectric layers 10 is considered to be an n-type semiconductor that uses free electrons as carriers to carry electric charges. That is, the dielectric particles 11 are considered to have properties as n-type semiconductor particles. In this case, at both of the junction interface B1 and the junction interface B2 of the junction interface B, a Schottky junction between the metal and the n-type semiconductor is considered to occur, and it is considered that electric current is easy to flow in the direction from the internal electrode layer 20 side toward the dielectric particles 11 and difficult to flow in the direction from the dielectric particles 11 side toward the internal electrode layer 20. Specifically, at the existence location of the fourth large particle 13d, a circuit C1 as shown in FIG. 3B is considered to be formed by a Schottky junction between the metal and the n-type semiconductor.

In the circuit C1, a Schottky diode SD-n1 corresponds with the junction interface B1, a resistance R1 corresponds with the fourth large particle 13d, and a Schottky diode SD-n2 corresponds with the junction interface B2. In the circuit C1, when electric current flows clockwise (i.e., the first internal electrode layer 21 is a positive electrode, and the second internal electrode layer 22 is a negative electrode), the Schottky diode SD-n2 at the junction interface B2 acts as a barrier (Schottky barrier) and hinders the flow of electric current. On the other hand, when electric current flows counterclockwise (i.e., the first internal electrode layer 21 is a negative electrode, and the second internal electrode layer 22 is a positive electrode), the Schottky diode SD-n1 at the junction interface B1 acts as a barrier (Schottky barrier) and hinders the flow of electric current. That is, at the existence location of the fourth large particle 13d, it is considered that the insulation resistance between the internal electrode layers mainly depends on the Schottky barrier at the junction interface B.

Figure 3C:
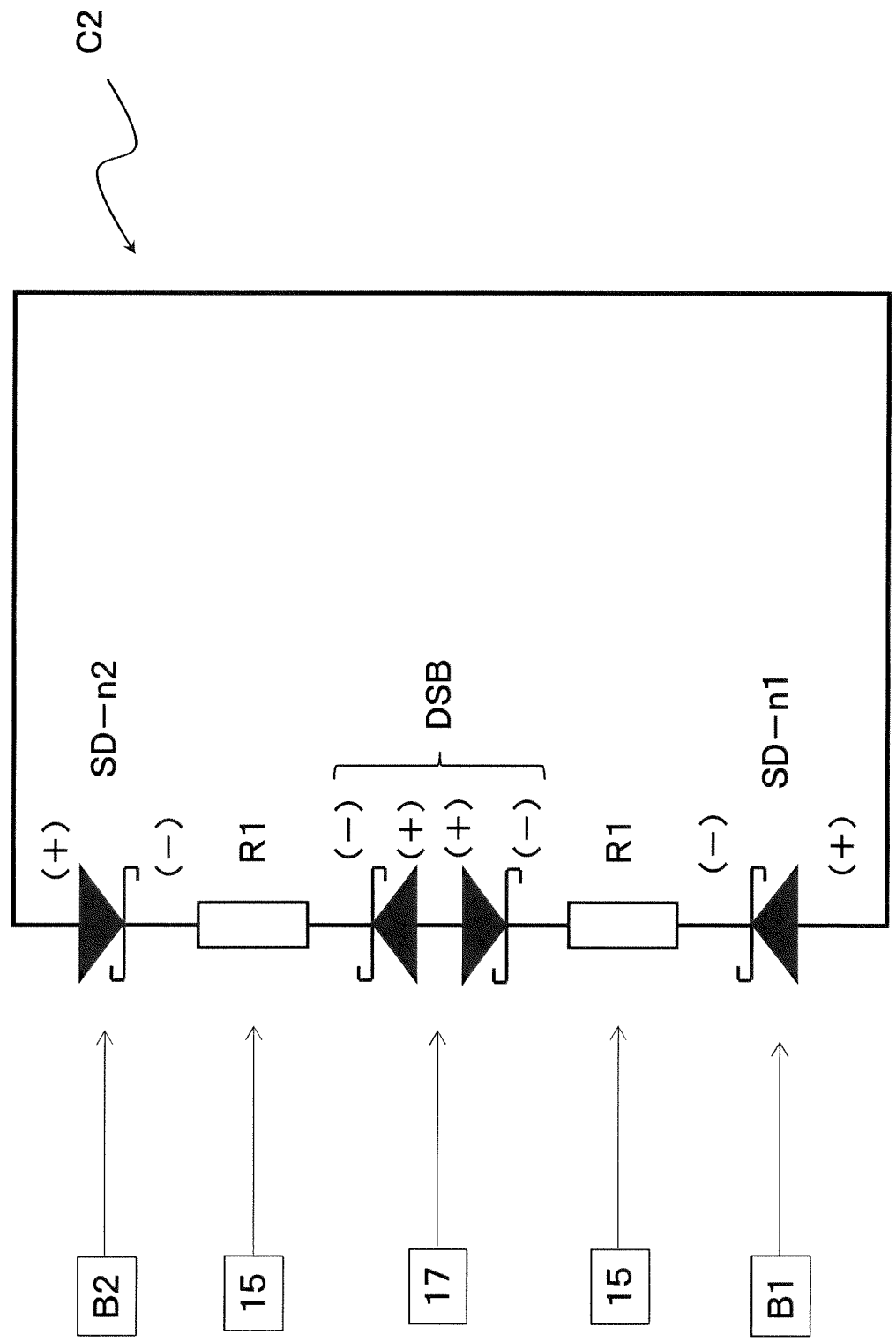
FIG. 3C is a conceptual view illustrating a circuit relating to the structure shown in FIG. 3A.

At the existence location of the small particles 15, a double Schottky barrier is considered to occur at the grain boundary 17 between the small particles next to each other, and a circuit C2 as shown in FIG. 3C is considered to be formed. Like the circuit C1, Schottky diodes SD-n1 and SD-n2 in the circuit C2 correspond with the junction interfaces B1 and B2, respectively. Also, the resistances R1 in the circuit C2 correspond with the small particles 15, and the double Schottky barrier DSB corresponds with the grain boundary 17. In the circuit C2, both of when electric current flows clockwise and when electric current flows counterclockwise, the double Schottky barrier DSB hinders the flow of electric current. That is, at the existence location of the small particles 15, it is considered that the insulation resistance between the inner wall electrode layers mainly depends on the double Schottky barrier at the grain boundary 17.

As described above, when the Ni oxide particles 30 do not exist, it is considered that the Schottky barrier at the junction interface B and the double Schottky barrier at the grain boundary 17 contribute to the insulation resistance, but both of the Schottky barrier and the double Schottky barrier are highly temperature dependent. That is, in a conventional multilayer ceramic electronic device that does not include the Ni oxide particles 30, the resistive action by Schottky barrier and the resistive action by double Schottky barrier decrease in a high temperature range, which is considered to cause a decrease in insulation resistance.

On the other hand, at the existence location of the Ni oxide particles 30, it is considered that there is a Schottky junction having a polarity different from that of the junction interface B. As shown in FIG. 4A, when the Ni oxide particles 30 exist between the internal electrode layers 20 and the dielectric layer 10, there is a junction interface A between the metal components of the internal electrode layers 20 and the Ni oxide particles 30. Among the junction interface A, the interface between the metal component of the first internal electrode layer 21 and the Ni oxide particle 30 is referred to as a junction interface A1, and the interface between the metal component of the second internal electrode layer 22 and the Ni oxide particle 30 is referred to as a junction interface A2.

Figure 4B:
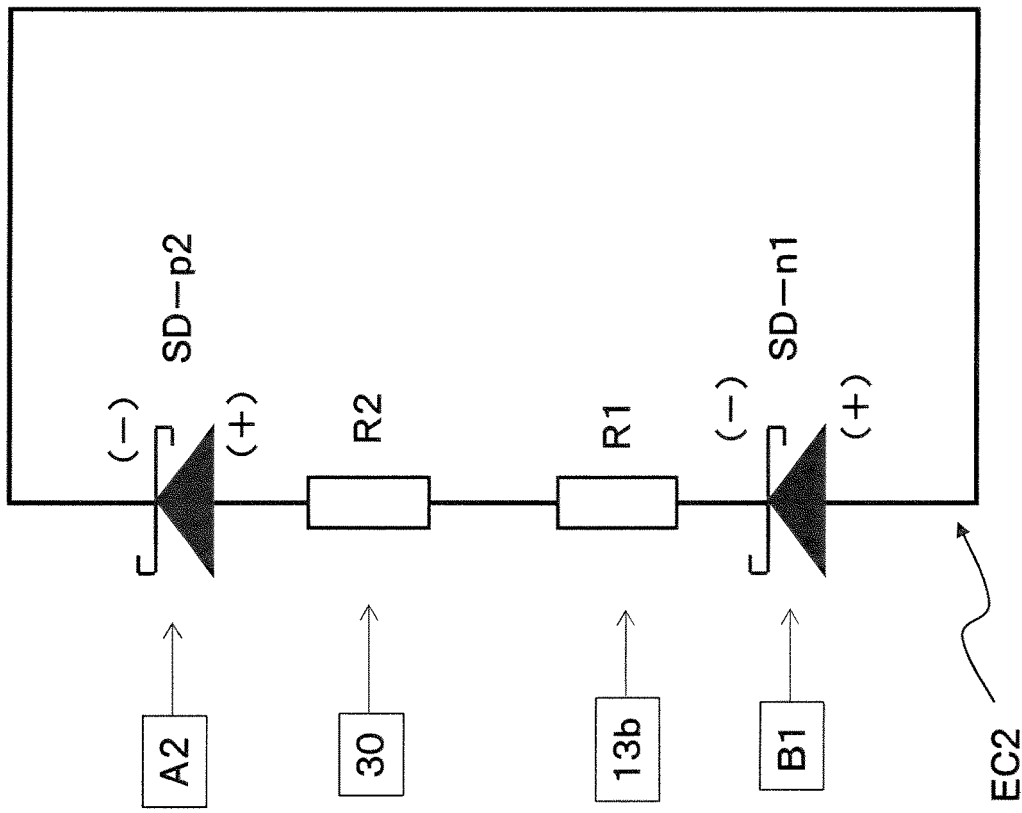
FIG. 4B is a conceptual view illustrating an equivalent circuit relating to the structure shown in FIG. 4A.
Figure 4B:
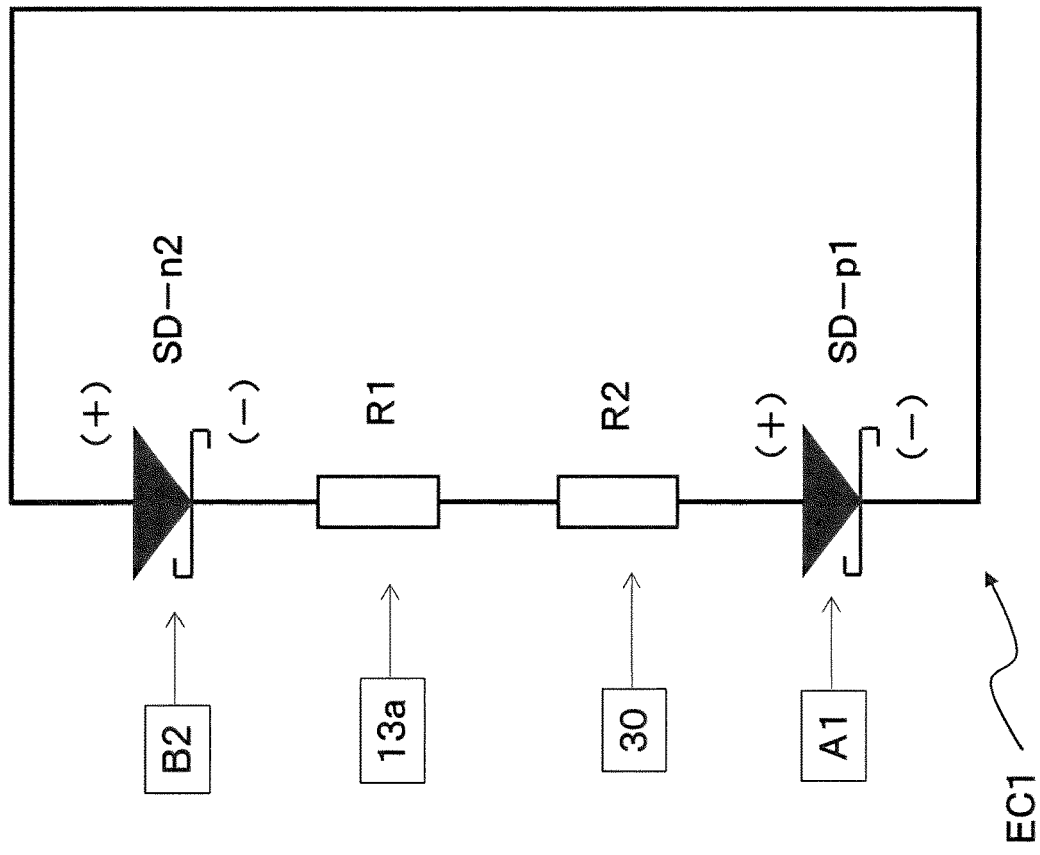

Here, NiO is considered to be a p-type semiconductor that uses holes as carriers, which is rare among oxides. That is, the Ni oxide particles 30 are considered to have properties as p-type semiconductor particles. In this case, at both of the junction interface A1 and the junction interface A2 of the junction interface A, a Schottky junction between the metal and the p-type semiconductor is considered to occur, and it is considered that electric current is easy to flow in the direction from the Ni oxide particles 30 toward the internal electrode layer 20 and difficult to flow in the direction from the internal electrode layer 20 toward the Ni oxide particles 30. Specifically, an equivalent circuit EC1 shown in the left part of FIG. 4B is considered to be formed at the existence location of the first large particle 13a, and an equivalent circuit EC2 shown in the right part of FIG. 4B is considered to be formed at the existence location of the second large particle 13b.

In the equivalent circuit EC1, a Schottky diode SD-p1 corresponds with the junction interface A1, a resistance R1 corresponds with the first large particle 13a, a resistance R2 corresponds with the Ni oxide particle 30, and a Schottky diode SD-n2 corresponds with the junction interface B2. In the equivalent circuit EC2, a Schottky diode SD-n1 corresponds with the junction interface B1, a resistance R1 corresponds with the second large particle 13b, a resistance R2 corresponds with the Ni oxide particle 30, and a Schottky diode SD-p2 corresponds with the junction interface A2. Assuming that the direction in which electric current flows comparatively easily is a "forward direction", the counterclockwise direction is the forward direction in the equivalent circuit EC1, and contrary to the equivalent circuit EC1, the clockwise direction is the forward direction in the equivalent circuit EC2.

When a voltage is applied with the first internal electrode layer 21 as the negative electrode and the second internal electrode layer 22 as the positive electrode, the insulation resistance between the internal electrode layers is considered to mainly depend on the resistance of the first large particle 13a in the equivalent circuit EC1. Also, when a voltage is applied with the first internal electrode layer 21 as the positive electrode and the second internal electrode layer 22 as the negative electrode, the insulation resistance between the internal electrode layers is considered to mainly depend on the resistance of the second large particle 13b in the equivalent circuit EC2. That is, the formation of the two equivalent circuits EC1 and EC2 is considered to prevent the occurrence of Schottky barriers and double Schottky barriers, and it is consequently considered that the temperature dependence of the resistance value is improved.

Note that, the capacitance region 40 of the multilayer ceramic electronic device 2 includes a plurality of dielectric layers 10 and a plurality of internal electrode layers 20, but in the observation of a cross section of the capacitance region 40 along the Z-axis direction, there may be the internal electrode layers 20 that are not in contact with the Ni oxide particles 30 and the dielectric layers 10 that do not include the first large particles 13a or the second large particles 13b. Preferably, however, each of the Ni oxide particles 30, the first large particles 13a, and the second large particles 13b exists at the following ratio.

Each of the internal electrode layers 20 is preferably in contact with two or more Ni oxide particles 30, more preferably two or more and 10 or less Ni oxide particles, on average in one cross section of the capacitance region 40 along the Z-axis direction. That is, in one cross section of the element body 4 as shown in FIG. 1, an average number ANP of Ni oxide particles 30 in contact with the internal electrode layers 20 per layer is preferably two or more and is more preferably two or more and 10 or less. When 2≤ANP is satisfied, the temperature dependence of the resistance value can be further reduced. When 2≤ANP≤10 is satisfied, the temperature dependence of the resistance value can be further reduced with a sufficient capacitance.

Note that, as shown in FIG. 1, the average number ANP described above is preferably analyzed in a cross section in which both ends of the internal electrode layers 20 in the X-axis direction can be observed. It is preferable to analyze five or more internal electrode layers 20 having a length L1 in such a cross section, and the average number ANP is calculated by measuring the number of Ni oxide particles 30 in contact with each of the internal electrode layers 20 having a length L1.

Preferably, in one cross section of the capacitance region 40 along the Z-axis direction, each of the dielectric layers 10 includes one or more first large particles 13a on average and one or more second large particles 13b on average. That is, in one cross section of the element body 4 as shown in FIG. 1, each of AND1 and AND2 is preferably one or more, where AND1 is an average number of first large particles 13a contained in the dielectric layers 10 per layer, and AND2 is an average number of second large particles 13b contained in the dielectric layers 10 per layer. Also, preferably, an average AND0 of the total numbers of first large particles 13a and second large particles 13b contained in the dielectric layers 10 per layer is two or more. When each of AND1 and AND2 is one or more, the temperature dependence of the resistance value can be further reduced. When AND0 is four or more, the temperature dependence of the resistance value can be further reduced with a sufficient capacitance.

AND0, AND1, and AND2 are calculated in the same manner as ANP. It is preferable to analyze five or more dielectric layers 10 having a length L0 in a cross section as shown in FIG. 1, and AND0, AND1, and AND2 are calculated by measuring the numbers of first large particles 13a and second large particles 13b contained in each of the dielectric layers 10 having a length L0.

LE is defined as a total length of the internal electrode layers 20 observed in a cross section of the capacitance region 40 as shown in FIG. 2. Also, in the range of the total length LE, NP0 is defined as a number of Ni oxide particles 30 in contact with the internal electrode layers 20. The average number of Ni oxide particles 30 in contact with the internal electrode layers 20 per unit length can be represented by a ratio of NP0 to LE, and NP0/LE is preferably 0.002 particles/μm or more and is more preferably 0.002 particles/μm or more and 0.02 particles/μm or less. When NP0/LE is 0.002 particles/μm or more, the temperature dependence of the resistance value can be further reduced. When NP0/LE is 0.002 particles/μm or more and 0.02 particles/μm or less, the temperature dependence of the resistance value can be further reduced with a sufficient capacitance.

Note that, in the calculation of NP0/LE, it is preferable to analyze a cross section of the capacitance region 40 for 500 μm² or more, and the total length LE is preferably set to 500 μm or more. Moreover, the analysis field of view is preferably determined so that the edge of a part of the analysis field of view is substantially parallel to the internal electrode layers 20. In this case, the length of the edge of the analysis field of view substantially parallel to the internal electrode layers 20 can be regarded as the length of the internal electrode layers 20 in this analysis field of view. For example, in the cross section shown in FIG. 2, the total length LE of the internal electrode layers 20 corresponds with $4L_X$ (four times the edge length $L_X$). Since 14 Ni oxide particles 30 exist in the cross section of FIG. 2, NP0/LE calculated in the cross section of FIG. 2 is $14/4L_X$ (particles/μm).

LD is defined as a total length of the dielectric layers 10 observed in a cross section of the capacitance region 40 as shown in FIG. 2. Also, in the range of the total length LD, ND1 is defined as a number of first large particles 13a contained in the dielectric layers 10, and ND2 is defined as a number of second large particles 13b contained in the dielectric layers 10. The average number of first large particles 13a contained in the dielectric layers 10 per unit length can be represented by ND1/LD, and the average number of second large particles 13b contained in the dielectric layers 10 per unit length can be represented by ND2/LD. Each of ND1/LD and ND2/LD is preferably 0.001 particles/μm or more. When this requirement is satisfied, the temperature dependence of the resistance value can be further reduced.

The average number of the total of first large particles 13a and second large particles 13b contained in the dielectric layers 10 per unit length can be represented by (ND1+ND2)/LD. Preferably, (ND1+ND2)/LD is 0.002 particles/μm or more. When this requirement is satisfied, the temperature dependence of the resistance value can be further reduced with a sufficient capacitance.

Note that, in the measurement of ND1 and ND2, it is preferable to analyze a cross section of the capacitance region 40 for 500 μm² or more, and the total length LD is preferably set to 500 μm or more.

Figure 5:
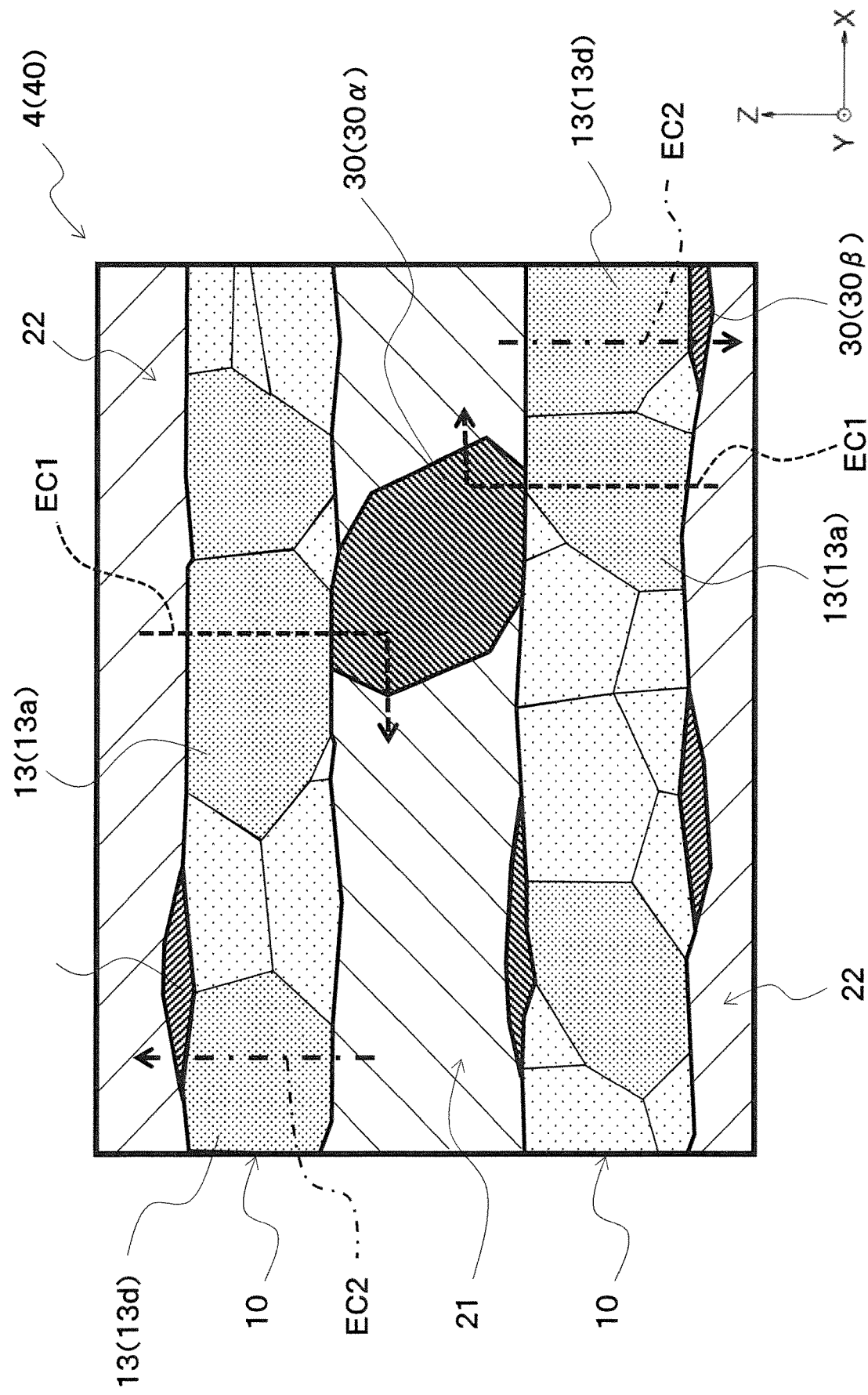
FIG. 5 is an enlarged schematic view of a part of a boundary between a dielectric layer and internal electrode layers.

Preferably, as shown in FIG. 5, the capacitance region 40 includes first Ni oxide particles 30α. Each of the first Ni oxide particles 30α is in contact with both of two dielectric layers 10 next to each other via the internal electrode layer 20. That is, the first Ni oxide particles 30α exist so as to penetrate the front and back surfaces of one internal electrode layer 20 in a cross section of the capacitance region 40. On the other hand, each of the Ni oxide particles 30 in contact with only either one of two dielectric layers 10 next to each other via the internal electrode layer 20 is referred to as a "second Ni oxide particle 300".

As shown in FIG. 5, each of the first Ni oxide particles 30α is in contact with two dielectric layers 10 and can thus be in contact with more large particles 13 than each of the second Ni oxide particles 300. That is, the first Ni oxide particles 30α are considered to be able to form more equivalent circuits EC than the second Ni oxide particles 300 and are considered to greatly contribute to reduction in the temperature dependence of the resistance value.

Preferably, NPβ<NPα is satisfied, where NPα be a number of first Ni oxide particles 30α contained in a cross section as shown in FIG. 2, and NPβ is a number of second Ni oxide particles 300 contained in the cross section. That is, preferably, when the Ni oxide particles 30 are classified based on the mode of the Ni oxide particles 30α observed in the cross section of the element body, the Ni oxide particles 30 mainly include the first Ni oxide particles 30α. When the capacitance region 40 includes the first Ni oxide particles 30α to the extent that NPβ<NPα is satisfied, the temperature dependence of the resistance value can be further reduced. Note that, in the measurement of NPα and NPβ, it is preferable to analyze a cross section of the capacitance region 40 for 200 μm² or more.

Each of the dielectric layers 10 may include a third large particle 13c in contact with the Ni oxide particles 30 at both of the first boundary 31 and the second boundary 32. When each of the large particles 13 is in contact with the Ni oxide particles 30 at both of the first boundary 31 and the second boundary 32, however, a Schottky junction between the internal electrode layer 20 and the Ni oxide particle 30 (a Schottky junction between the metal and the p-type semiconductor) is considered to be formed at each of the first boundary 31 and the second boundary 32. Thus, it is considered that the equivalent circuit EC (EC1, EC2) shown in FIG. 4B is not formed at the existence locations of the first large particles 13a, and that the third large particles 13c do not contribute to reduction in the temperature dependence of the resistance value.

Preferably, the average number ND3/LD of third large particles 13c contained in the dielectric layers 10 per unit length is 0 or more and 0.0003 particles/μm or less. Note that, ND3 is a number of third large particles 13c contained in the dielectric layers 10 in a cross section of the capacitance region 40 as shown in FIG. 2. In the calculation of ND3/LD, like ND1/LD and ND2/LD, it is preferable to analyze a cross section of the capacitance region 40 for 500 μm² or more, and the total length LD is preferably set to 500 μm or more.

The average particle size $d_P$ of the Ni oxide particles 30 is not limited and is preferably 0.03 μm or more and 1.5 μm or less, more preferably 0.05 μm or more and 1 μm or less, for example. Also, preferably, the average particle size $d_P$ of the Ni oxide particles 30 is larger than the average particle size $d_M$ of the metal crystals contained in the internal electrode layers 20. Specifically, preferably, the ratio ($d_P/d_M$) of $d_P$ to $d_M$ is three or more. Note that, the upper limit of $d_P/d_M$ is not limited, and $d_P/d_M$ can be 10 or less, for example. Also, preferably, the average particle size $d_P$ of the Ni oxide particles 30 is calculated by observing a cross section of the capacitance region 40 and measuring equivalent circle diameters of at least five Ni oxide particles 30.

Next, an example of a method of manufacturing a multilayer ceramic electronic device 2 shown in FIG. 1 is described.

First, a dielectric paste and an internal-electrode paste are prepared. The dielectric paste can be produced by adding a dielectric raw material powder (main component powder) and a subcomponent powder to a known organic vehicle or a known aqueous vehicle and kneading them. In addition to the above, a dispersant, a plasticizer, glass frit, etc. may be added to the dielectric paste. On the other hand, the internal-electrode paste can be produced by adding a metal powder, such as Ni powder, and a NiO powder to a known organic vehicle or a known aqueous vehicle and kneading them. A dielectric material powder may be added as an inhibitor to the internal-electrode paste. A dispersant, a plasticizer, etc. may be added to the internal-electrode paste.

Next, the dielectric paste is sheeted by a method, such as a doctor blade method, to obtain green sheets. Then, the internal-electrode paste is applied in a predetermined pattern onto the green sheets by various printing methods, such as screen printing and a transfer method.

Here, the NiO powder added to the internal-electrode paste is the raw material of the Ni oxide particles 30. ANP, NP0/LE, NPα, NPβ, and the like mentioned above can be controlled based on the mixing ratio of the NiO powder in the internal-electrode paste, the particle size of the NiO powder, the thickness of the internal electrode layers 20, and the like.

For example, in the internal-electrode paste, the NiO powder preferably has an average particle size of 0.03 μm or more and more preferably has an average particle size of 0.05 μm or more and 0.8 μm or less. Also, the metal powder preferably has an average particle size of 0.8 μm or less and more preferably has an average particle size of 0.03 μm or more and 0.5 μm or less. The mixing ratio of the NiO powder in the internal-electrode paste is preferably 10 parts by weight or more and 25 parts by weight or less, more preferably 15 parts by weight or more and 20 parts by weight or less, with respect to 100 parts by weight of the metal powder. The average thickness $T_{EL}$ of the internal electrode layers 20 can be controlled by the thickness of the internal-electrode paste applied on the green sheets. The thickness of the internal-electrode paste is preferably 2 μm or less, more preferably 0.2 μm or more and 1 μm or less.

ND/LD, which indicates a ratio of the large particles 13 in the dielectric layers 10, can be controlled based on the particle size of the dielectric raw material powder, the thickness of the dielectric layers 10, and the like. For example, the average particle size of the dielectric raw material powder is preferably 0.05 μm or more, more preferably 0.06 μm or more and 0.2 μm or less. The average thickness $T_{DL}$ of the dielectric layers 10 can be controlled by the thickness of the green sheets, and the average thickness of the green sheets is preferably 2 μm or less, more preferably 0.2 μm or more and 1 μm or less. Note that, the ratio (AND0, AND1, AND2, ND1/LD, ND2/LD, (ND1+ND2)/LD, etc.) of the large particles 13 (the first large particles 13a and the second large particles 13b) in contact with the Ni oxide particles 30 can be controlled based on the proportion between the particle size of the dielectric raw material powder and the thickness of the green sheets, the mixing ratio of the NiO powder in the internal-electrode paste, and the like.

Next, a mother laminate is obtained by laminating a plurality of green sheets applied with the internal-electrode paste and then pressing them in the lamination direction. Note that, one or more green sheets that are not applied with the internal-electrode paste are laminated on the uppermost part and the lowermost part of the mother laminate in the lamination direction. When green sheets that are not applied with the internal-electrode paste are laminated in such a manner, the exterior regions 41 can be formed above and below the capacitance region 40.

A plurality of green chips is obtained by cutting the mother laminate obtained by the above-mentioned steps into a predetermined size by dicing or press-cutting. If necessary, the green chips may be dried for removing the plasticizer and the like and may be subjected to barrel polishing using a horizontal centrifugal barrel machine or the like after drying.

Next, the green chips obtained above are subjected to a binder removal treatment and a firing treatment to obtain the element body 4.

The conditions for the binder removal treatment are not limited and are appropriately determined based on the types of binders contained in the dielectric paste and the internal-electrode paste. For example, the heating rate is preferably 5 to 300° C./hour, the holding temperature is preferably 180 to 400° C., and the temperature holding time is preferably 0.5 to 24 hours. The atmosphere for the binder removal treatment can be an atmospheric atmosphere (i.e., in the air) or a reducing atmosphere and is preferably an atmospheric atmosphere.

The conditions for the firing treatment are not limited and are appropriately determined based on the composition of the main component of the dielectric layers 10 and the metal component of the internal electrode layers 20. For example, the holding temperature during firing is preferably 1200 to 1350° C., more preferably 1220 to 1300° C., and the holding time during firing is preferably 0.05 to 8 hours, more preferably 0.5 to 3 hours. The firing atmosphere is preferably a reducing atmosphere, and for example, a mixed gas of $N_2$ and $H_2$ can be humidified and used as the atmosphere gas. Moreover, when the internal electrode layers 20 are composed of a base metal such as Ni and Ni alloy, the oxygen partial pressure in the firing atmosphere is preferably $1.0 \times 10^{-4}$ MPa to $1.0 \times 10^{-10}$ MPa.

An annealing treatment may be performed on the element body 4 after firing. For example, an annealing treatment is preferably performed for reoxidation of the dielectric layers 10 or for removal of strain generated by firing. The conditions for the annealing treatment are not limited and are appropriately determined based on the composition of the main component of the dielectric layers 10 and the like. For example, the holding temperature is preferably 650 to 1150° C., the temperature holding time is preferably 0 to 20 hours, and the heating rate and the cooling rate are preferably 50 to 500° C./hour. As the atmosphere gas, it is preferable to use a dry $N_2$ gas, a humidified $N_2$ gas, or the like.

In order to humidify the $N_2$ gas, the mixed gas, and the like in the binder removal treatment, the firing treatment, and the annealing treatment, for example, a wetter or the like is used. In this case, the water temperature is preferably about 5 to 75° C. The binder removal treatment, the firing treatment, and the annealing treatment may be performed continuously or independently.

Note that, the end surfaces 4a and 4b of the element body 4 may be polished before the external electrodes 6 are formed. Polishing methods include, for example, barrel polishing, sandblasting, laser, and the like. When the end surfaces 4a and 4b of the element body 4 are polished, the internal electrode layers 20 and the external electrodes 6 are easily electrically connected.

Next, a pair of external electrodes 6 is formed on the outer surface of the element body 4. The method of forming the external electrodes 6 is not limited and is a known method. Through the above-described steps, the multilayer ceramic electronic device 2 shown in FIG. 1 is obtained.

Summary of Embodiment

The multilayer ceramic electronic device 2 of the present embodiment includes the internal electrode layers 20 and the dielectric layers 10 laminated between the internal electrode layers 20. The capacitance region 40 of the element body 4 includes the Ni oxide particles 30 existing at the boundaries (the first boundaries 31 and the second boundaries 32) between the internal electrode layers 20 and the dielectric layers 10. Then, each of the dielectric layers 10 includes the first large particles 13a in contact with the Ni oxide particles 30 existing at the first boundaries 31 and in contact with the internal electrode layers 20 at the second boundaries 32 and the second large particles 13b in contact with the internal electrode layers 20 at the first boundaries 31 and in contact with the Ni oxide particles 30 existing at the second boundaries 32.

Since the multilayer ceramic electronic device 2 has the above-mentioned characteristics, it is possible to reduce variation in the resistance value due to temperature. For example, $R_{20}/R_{85}$ can be reduced to 2.0 or less, where $R_{20}$ is a resistance value of the multilayer ceramic electronic device 2 at 20° C., and $R_{85}$ is a resistance value of the multilayer ceramic electronic device 2 at 85° C.

The reason why the temperature dependence of the resistance value is improved is not necessarily clear, but it is considered that the generation of Schottky barriers and double Schottky barriers can be prevented. Specifically, it is considered that two equivalent circuits EC1 and EC2 as shown in FIG. 4B are formed at the contact point between the Ni oxide particle 30 and the first large particle 13a and the contact point between the Ni oxide particle 30 and the second large particle 13b. When such equivalent circuits EC1 and EC2 are formed, the insulation resistance between the internal electrode layers depends on the resistance of the dielectric particles 11, and the generation of highly temperature-dependent Schottky barriers and double Schottky barriers is considered to be prevented.

Note that, from the viewpoint of forming the equivalent circuits EC1 and EC2 shown in FIG. 4B, it is sufficient that the p-type semiconductor particles exist at the first boundaries 31 and the second boundaries 32 and are in contact with the large particles 13 of the dielectric layers 10. That is, in FIG. 2 and FIG. 4A, the particles indicated by reference numeral "30" are not necessarily limited to Ni oxide particles (NiO) and are enough to be p-type semiconductor particles.

Preferably, the Ni oxide particles 30 include the first Ni oxide particles 30α in contact with two dielectric layers 10 next to each other via the internal electrode layer 20. The first Ni oxide particles 30α may be able to contact with more large particles 13 than the second Ni oxide particles 300. That is, when the capacitance region 40 includes the first Ni oxide particles 30α, the temperature dependence of the resistance value can be more effectively reduced.

Preferably, each of the internal electrode layers 20 is in contact with two or more Ni oxide particles 30 on average in one cross section of the element body 4. In other words, preferably, the average number ANP of Ni oxide particles 30 in contact with the internal electrode layers 20 per layer is two or more. When the multilayer ceramic electronic device 2 satisfies this requirement, the temperature dependence of the resistance value can be further reduced.

Preferably, the average number NP0/LE of the Ni oxide particles 30 in contact with the internal electrode layers 20 per unit length is 0.002 particles/μm or more. When the multilayer ceramic electronic device 2 satisfies this requirement, the temperature dependence of the resistance value can be further reduced.

The dielectric layers 10 may include the third dielectric large particles 13c in contact with both of the Ni oxide particles 30 at the first boundaries 31 and the Ni oxide particles 30 at the second boundaries 32. Preferably, the average number ND3/LD of the third large particles 13c contained in the dielectric layers 10 per unit length is 0 or more and 0.0003 particles/μm or less. When the multilayer ceramic electronic device 2 satisfies this requirement, the temperature dependence of the resistance value can be further reduced.

Hereinbefore, an embodiment of the present disclosure is described, but the present disclosure is not limited to the above-described embodiment at all and may variously be modified within the scope that does not deviate from the gist of the present disclosure.

For example, the external electrodes 6 may be pad-shaped electrodes existing on one side surface 4c of the element body 4. In this case, the pad-shaped external electrodes 6 may be electrically connected to the internal electrode layers 20 via through-hole electrodes or via-hole electrodes.

It is sufficient that the electronic device of the present disclosure includes at least one first internal electrode layer 21, at least one second internal electrode layer 22, and at least one dielectric layer 10, and the electronic device of the present disclosure is not limited to the multilayer ceramic electronic device 2 as shown in FIG. 1.

EXAMPLES

Hereinafter, the present disclosure is described based on more detailed examples, but the present disclosure is not limited to these examples.
(Experiment 1)

In Experiment 1, multilayer ceramic electronic devices according to Example A1 and Comparative Examples 1 to 3 were manufactured in the following procedure.

Example A1

First, a dielectric paste as a raw material for dielectric layers was prepared using a $(Ba,Ca)(Ti,Zr)O_3$ powder (main component powder) having an average particle size of 0.09 μm and subcomponent powders ($MgCO_3$ powder, $Y_2O_3$ powder, $MnCO_3$ powder, $V_2O_5$ powder, and $SiO_2$ powder). Also, an internal-electrode paste was prepared using a Ni powder having an average particle size of 0.18 μm and a NiO powder having an average particle size of 0.15 μm. The mixing ratio of the NiO powder in the internal-electrode paste was 17 parts by weight with respect to 100 parts by weight of the Ni powder.

Next, the dielectric paste was applied onto PET films and sheeted so as to obtain green sheets each having a thickness of 0.65 μm, and the internal-electrode paste was thereafter applied onto these green sheets in a predetermined pattern. Note that, the application amount of the internal-electrode paste was controlled so that the average thickness $T_{EL}$ of the internal electrode layers after firing would be 0.55 μm.

Next, the green sheets applied with the internal-electrode paste were laminated and pressed to obtain a mother laminate. At this time, the green sheets not applied with the internal-electrode paste were laminated on the uppermost part and the lowermost part of the mother laminate in the lamination direction. Also, the lamination number of green sheets applied with the internal-electrode paste was controlled so that the lamination number of dielectric layers in the capacitance region was 350. Also, the thickness of each of exterior regions 41 after firing was controlled so as to be 20 μm or more.

After cutting the mother laminate into a predetermined size so as to obtain green chips, these green chips were subjected to a binder removal treatment, a firing treatment, and an annealing treatment. Then, an external electrode containing a sintered body whose main component was Cu was formed on each end surface of an element body. Through the above steps, a multilayer ceramic electronic device having a cross-sectional structure similar to that in FIG. 1 was obtained. The average size of the element body in this multilayer ceramic electronic device was L0×W0=0.7 mm×0.45 mm.

Comparative Example 1

In Comparative Example 1, both of first internal electrode layers and second internal electrode layers were formed using an internal-electrode paste containing no NiO powder. Specifically, in Comparative Example 1, an internal-electrode paste was prepared using a Ni powder having an average particle size of 0.18 μm, and no NiO powder was added to this internal-electrode paste. Then, the internal-electrode paste was applied in a predetermined pattern onto green sheets each having a thickness of 0.65 μm. Note that, in Comparative Example 1, a dielectric paste with the same specifications as in Example A1 was used, and the thickness of each of the green sheets was controlled to the same extent as in Example A1. A multilayer ceramic electronic device according to Comparative Example 1 was manufactured under the same manufacturing conditions as in Example A1 except for those described above.

Comparative Example 2

In Comparative Example 2, as raw materials for the internal electrode layers, a first internal-electrode paste containing a NiO powder and a second internal-electrode paste containing no NiO powder were prepared. A Ni powder having an average particle size of 0.18 μm and the NiO powder having an average particle size of 0.15 μm were added to the first internal-electrode paste, and the mixing ratio of the NiO powder in the first internal-electrode paste was 17 parts by weight with respect to 100 parts by weight of the Ni powder. On the other hand, a Ni powder having an average particle size of 0.18 μm was added to a second internal-electrode paste, and no NiO powder was added thereto. Note that, in Comparative Example 2, the same dielectric paste as in Example A1 was used, and the thickness of each green sheet was controlled to the same extent as in Example A1.

In Comparative Example 2, first green sheets applied with the first internal-electrode paste and second green sheets applied with the second internal-electrode paste were produced, and the first green sheets and the second green sheets were alternately laminated to obtain a mother laminate. A multilayer ceramic electronic device according to Comparative Example 2 was manufactured under the same manufacturing conditions as in Example A1 except for those described above.

Comparative Example 3

In Comparative Example 3, internal electrode layers were formed using the same internal-electrode paste as in Example A1. In Comparative Example 3, however, dielectric layers were formed under conditions different from those in Example A1. Specifically, in Comparative Example 3, a dielectric paste containing a $(Ba,Ca)(Ti,Zr)O_3$ powder (main component powder) having an average particle size of 0.04 μm was prepared, and green sheets each having a thickness of 0.65 μm was produced using this dielectric paste. As described above, the $(Ba,Ca)(Ti,Zr)O_3$ powder employed in Comparative Example 3 had an average particle size different from that in Example A1, but the subcomponent powder added to the dielectric paste and the mixing ratio of the subcomponent powder were the same as those in Example A1. A multilayer ceramic electronic device according to Comparative Example 3 was manufactured under the same manufacturing conditions as in Example A1 except for those described above.

Cross-Sectional Analysis of Element Body

A cross section of the element body in the lamination direction (a cross section of the capacitance region as shown in FIG. 1 and FIG. 2) was observed with a STEM, and an average thickness $T_{EL}$ (μm) of the internal electrode layers, an average thickness $T_{DL}$ (μm) of the dielectric layers, and an average particle size $d_{DP}$ (μm) of the dielectric particles contained in the dielectric layers were measured.

In this cross-sectional observation, the internal electrode layers within the analysis field of view were numbered from the lower side of the analysis field of view. Then, the odd-numbered internal electrode layers were determined as the first internal electrode layers, and the even-numbered internal electrode layers were determined as the second internal electrode layers. Also, an elemental mapping analysis by EDS was performed in five analysis fields of view (area of each analysis field of view: 54 μm$^2$) so as to determine whether or not Ni oxide particles were present in the first boundaries between the first internal electrode layers and the dielectric layers and the second boundaries between the second internal electrode layers and the dielectric layers. "Y" and "N" are described in the column of "Existence of Ni Oxide Particles" in Table 1. "Y" means that Ni oxide particles were present at the first boundaries or the second boundaries, and "N" means that Ni oxide particles were not observed at predetermined locations.

In the above cross-sectional analysis, dielectric particles in contact with the Ni oxide particles at the first boundaries and in contact with the metal component of the internal electrode layers at the second boundaries were determined as first large particles (13a). Also, dielectric particles in contact with the metal component of the internal electrode layers at the first boundaries and in contact with the Ni oxide particles at the second boundaries were determined as second large particles (13b). In the column of "First Large Particles" of Table 1, "Y" means that the first large particles were contained in the dielectric layers, and "N" means that the first large particles were not contained in the dielectric layers. Likewise, in the column of "Second Large Particles" of Table 1, "Y" means that the second large particles were contained in the dielectric layers, and "N" means that the second large particles were not contained in the dielectric layers.

Evaluation for Temperature Dependence of Resistance Value

A DC voltage of 4V was applied to the multilayer ceramic electronic device from any direction for 30 seconds, and an insulation resistance of the multilayer ceramic electronic device at this time was measured and defined as a resistance value. The ambient temperature for measuring the resistance value was set to 20° C. and 85° C., and a ratio ($R_{20}/R_{85}$) of a resistance value $R_{20}$ at 20° C. to a resistance value $R_{85}$ at 85° C. was calculated. Note that, the direction of the DC voltage at the time of measuring the resistance value $R_{85}$ corresponded with the direction of the DC voltage at the time of measuring the resistance value $R_{20}$.

In the present experiment, with respect to the temperature dependence of the resistance value, a sample having $R_{20}/R_{85}$ of 2.0 or less was determined as "good", and a sample having $R_{20}/R_{85}$ of 1.5 or less was determined as "particularly good". Table 1 shows the evaluation results of Example A1 and Comparative Examples 1 to 3.

TABLE 1

| | Results of Cross-Sectional Analysis | | | | | | | | |
|---|---|---|---|---|---|---|---|---|---|
| | Internal Electrode | Existence of Ni Oxide Particles | | Dielectric Layers | | | | | |
| Sample No. | Layers $T_{EL}$ (μm) | First Boundaries | Second Boundaries | $T_{DL}$ (μm) | $d_{DP}$ (μm) | $T_{DL}/d_{DP}$ | First Large Particles | Second Large Particles | $R_{20}/R_{85}$ (—) |
| Comp. Ex. 1 | 0.54 | N | N | 0.55 | 0.59 | 0.93 | N | N | 8.8 |
| Comp. Ex. 2 | 0.55 | Y | N | 0.55 | 0.57 | 0.96 | Y | N | 7.9 |
| Comp. Ex. 3 | 0.56 | Y | Y | 0.54 | 0.31 | 1.74 | N | N | 8.2 |
| Ex. A1 | 0.53 | Y | Y | 0.55 | 0.58 | 0.95 | Y | Y | 1.3 |

In Comparative Example 1, since the internal-electrode paste containing no NiO powder was employed, Ni oxide particles did not exist at the boundaries between the dielectric layers and the internal electrode layers, and the first large particles and the second large particles in contact with Ni oxide particles were not contained in the dielectric layers. In Comparative Example 2, since the first internal-electrode paste containing NiO and the second internal-electrode paste not containing NiO were employed, Ni oxide particles were observed at the first boundaries. In Comparative Example 2, however, no Ni oxide particles were observed at the second boundaries, and the second large particles were not contained in the dielectric layers.

In Comparative Example 3, Ni oxide particles were observed at both of the first boundaries and the second boundaries. However, large particles (reference numeral: 13) were hardly contained in the dielectric layers of Comparative Example 3, and first large particles and second large particles in contact with the Ni oxide particles were not detected in the cross-sectional analysis of Comparative Example 3. That is, in Comparative Example 3, the Ni oxide particles in the capacitance region were in contact with small particles (reference numeral: 15) of the dielectric layers and were not in contact with the large particles.

On the other hand, in the cross-sectional analysis of Example A1, Ni oxide particles were observed at both of the first boundaries and the second boundaries, and first large particles and second large particles in contact with the Ni oxide particles were present in the dielectric layers. That is, in Example A1, the capacitance region had a cross-sectional structure as shown in FIG. 4A.

In Comparative Examples 1 to 3, the insulation resistance decreased at 85° C., and $R_{20}/R_{85}$ was larger than 2.0. On the other hand, in the multilayer ceramic electronic device of Example A1 having a cross-sectional structure as shown in FIG. 4A, a high insulation resistance was obtained even at 85° C., and $R_{20}/R_{85}$ was 2.0 or less. From the results of Experiment 1, it was found that the temperature dependence of the resistance value can be reduced by the existence of Ni oxide particles at both of the first boundaries and the second boundaries and the inclusion of first large particles and second large particles in contact with the Ni oxide particles in the dielectric layers.

(Experiment 2)

In Experiment 2, four multilayer ceramic electronic devices according to Examples B1 to B4 shown in Table 2 were manufactured by changing the mixing ratio of NiO in the internal-electrode paste. The manufacturing conditions other than the mixing ratio of NiO were the same as those of Example A1 in Experiment 1.

In the cross-sectional observation of Experiment 2, the number of Ni oxide particles in contact with each internal electrode layer was measured in a cross section of the element body in its lamination direction as shown in FIG. 1. Then, an average number ANP of Ni oxide particles in contact with the internal electrode layers per layer was calculated. Also, the internal electrode layers having a total length of 920 μm or more contained in the cross section of 1134 μm² were analyzed to calculate an average number NP0/LE (particles/μm) of Ni oxide particles in contact with the internal electrode layers per unit length.

The dielectric layers having a total length of 920 μm or more contained in the cross section of 1134 μm was analyzed, and dielectric particles in contact with Ni oxide particles at first boundaries and in contact with Ni oxide particles at second boundaries were determined as third large particles (13c). Then, an average number ND3/LD of third large particles contained in the dielectric layers 10 per unit length was calculated.

Note that, in Examples B1 to B4 of Experiment 2, Ni oxide particles were observed at both of the first boundaries and the second boundaries, and first large particles and second large particles in contact with the Ni oxide particles were contained in the dielectric layers.

In Experiment 2, like Experiment 1, the insulation resistance of the multilayer ceramic electronic device was measured, and the temperature dependence of the resistance value in each Example was evaluated. Moreover, in Experiment 2, a capacitance (F) of the multilayer ceramic electronic device was measured using an LCR meter. At this time, after setting the measurement temperature to the room temperature (25° C.), a signal having a frequency of 1 kHz and an input signal level (measurement voltage) of 1 Vrms was input to the multilayer ceramic electronic device. A sample having a capacitance of 3.0 μF or more was determined as "good", and a sample having a capacitance of 3.5 μF or more was determined as "particularly good". Table 2 shows the evaluation results of Experiment 2.

TABLE 2

Results of Cross-Sectional Analysis

| Sample No. | ANP | NP0/LE (μm⁻¹) | ND3/LD (μm⁻¹) | $R_{20}/R_{85}$ (—) | Capacitance (μF) |
|---|---|---|---|---|---|
| Ex. B1 | 1.2 | 0.0011 | less than 0.0001 | 1.7 | 4.1 |
| Ex. B2 | 2.3 | 0.0030 | less than 0.0001 | 1.4 | 4.1 |
| Ex. A1 | 3.3 | 0.0060 | 0.0001 | 1.3 | 4.0 |
| Ex. B3 | 5.8 | 0.0090 | 0.0001 | 1.2 | 4.1 |
| Ex. B4 | 11.2 | 0.0230 | 0.0004 | 1.4 | 3.2 |

As shown in Table 2, it was found that the average number ANP of Ni oxide particles in contact with the internal electrode layers per layer is preferably two or more, more preferably two or more and 10 or less. It was also found that the average number NP0/LE of Ni oxide particles in contact with the internal electrode layers per unit length is preferably 0.002 particles/μm or more, more preferably 0.002 particles/μm or more and 0.02 particles/μm or less.

It was also found that, from the viewpoint of reducing the temperature dependence of the resistance value with a sufficient capacitance, the average number ND3/LD of third large particles contained in the dielectric layers per unit length is preferably 0.0003 particles/μm or less.

(Experiment 3)

In Experiment 3, an internal-electrode paste was prepared using a NiO powder having a smaller particle size than that of Example A1. Specifically, the average particle size of the NiO powder employed in Experiment 3 was 0.06 μm. A multilayer ceramic electronic device according to Example C1 was manufactured under the same manufacturing conditions as in Example A1 except for the specifications of the NiO powder.

In the cross-sectional analysis of Experiment 3, after performing an elemental mapping analysis by EDS in five analysis fields of view (area of each analysis field of view: 54 μm²) and determining Ni oxide particles existing in this analysis range, these Ni oxide particles were classified into "first Ni oxide particles (30α)" and "second Ni oxide particles (30β)". Then, the number NPα of first Ni oxide particles and the number NPβ of second Ni oxide particles were measured. Note that, the first Ni oxide particles were Ni oxide particles in contact with both of two dielectric layers next to each other via the internal electrode layer, and the second Ni oxide particles were Ni oxide particles in contact with either one of two dielectric layers next to each other (see FIG. 5).

In the cross-sectional analysis of Experiment 3, an average particle size $d_M$ of metal crystals contained in the internal electrode layers and an average particle size $d_P$ of Ni oxide particles were measured, and a ratio of $d_P$ to $d_M$ (no units) was calculated.

Note that, in Example C1, similarly to Example A1, Ni oxide particles were observed at the first boundaries and the second boundaries, and the first large particles and the second large particles in contact with the Ni oxide particles were present in the dielectric layers. Table 3 shows the evaluation results of Experiment 3.

TABLE 3

Results of Cross-Sectional Analysis

| Sample No. | Ni Oxide Particles | $d_P/d_M$ (—) | $R_{20}/R_{85}$ (—) | Capacitance (μF) |
|---|---|---|---|---|
| Ex. C1 | NPα < NPβ | 2.0 | 1.8 | 3.9 |
| Ex. A1 | NPα > NPβ | 4.5 | 1.3 | 4.0 |

As shown in Table 3, $R_{20}/R_{85}$ was smaller in Example A1 (the ratio of the first Ni oxide particles was higher) than in Example C1 (the ratio of the first Ni oxide particles was lower). From this result, it was found that the temperature dependence of the resistance value can be further improved by the existence of the first Ni oxide particles in contact with two dielectric layers within the capacitance region.

DESCRIPTION OF THE REFERENCE NUMERICAL

2 . . . multilayer ceramic electronic device
4 . . . element body 4a, 4b . . . end surface
4c . . . side surface
40 . . . capacitance region
41 . . . exterior region
6 . . . external electrode
6a . . . first external electrode
6b . . . second external electrode
10 . . . dielectric layer
11 . . . dielectric particle
13 . . . large particle
13a . . . first large particle
13b . . . second large particle
13c . . . third large particle
13d . . . fourth large particle
15 . . . small particle
17 . . . grain boundary
20 . . . internal electrode layer
21 . . . first internal electrode layer
22 . . . second internal electrode layer
31 . . . first boundary
32 . . . second boundary
30 . . . Ni oxide particle
30a . . . first Ni oxide particle
300 . . . second Ni oxide particle

What is claimed is:

1. An electronic device comprising:
an element body including:
    at least two internal electrode layers; and
    a dielectric layer laminated between the internal electrode layers, wherein
Ni oxide particles exist at a boundary between the internal electrode layers and the dielectric layer,
the dielectric layer is in contact with the internal electrode layers at a first boundary and a second boundary of the boundary, and
the dielectric layer includes:
    a first dielectric large particle in contact with at least one of the Ni oxide particles existing at the first boundary and in contact with one of the internal electrode layers at the second boundary; and
    a second dielectric large particle in contact with at least one of the internal electrode layers at the first boundary and in contact with at least one of the Ni oxide particles existing at the second boundary.

2. The electronic device according to claim 1, wherein
the dielectric layer comprises dielectric layers, and
the Ni oxide particles include a first Ni oxide particle in contact with both of two dielectric layers next to each other via the internal electrode layers.

3. The electronic device according to claim 1, wherein
the dielectric layer comprises dielectric layers, and
each of the internal electrode layers is in contact with two or more Ni oxide particles on average in a cross section of the element body.

4. The electronic device according to claim 1, wherein
the dielectric layer comprises dielectric layers, and
an average number of the Ni oxide particles in contact with the internal electrode layers per unit length is 0.002 particles/µm or more.

5. The electronic device according to claim 1, wherein
the dielectric layer comprises dielectric layers,
the dielectric layers include third dielectric large particles in contact with both of the Ni oxide particles at the first boundary and the Ni oxide particles at the second boundary, and
an average number of the third dielectric large particles contained in the dielectric layers per unit length is 0 or more and 0.0003 particles/µm or less.

6. An electronic device comprising:
an element body including:
    at least two internal electrode layers; and
    a dielectric layer laminated between the internal electrode layers, wherein
a p-type semiconductor particle exists at a boundary between the internal electrode layers and the dielectric layer,
the dielectric layer is in contact with the internal electrode layers next to each other at a first boundary and a second boundary of the boundary, and
the dielectric layer includes:
    a first dielectric large particle in contact with the p-type semiconductor particle existing at the first boundary and in contact with one of the internal electrode layers at the second boundary; and
    a second dielectric large particle in contact with one of the internal electrode layers at the second boundary and in contact with the p-type semiconductor particle existing at the second boundary.

* * * * *